E. E. ARNOLD.
RETAINER FOR ROLLER THRUST BEARINGS.
APPLICATION FILED JULY 15, 1918. RENEWED OCT. 24, 1919.
1,324,769.
Patented Dec. 9, 1919.
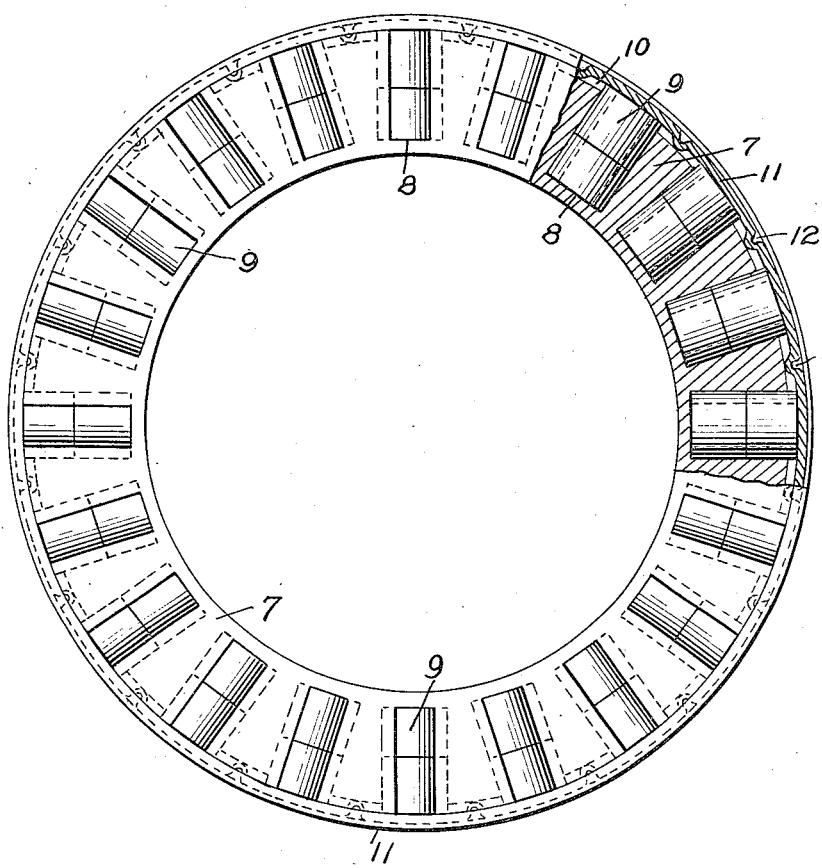
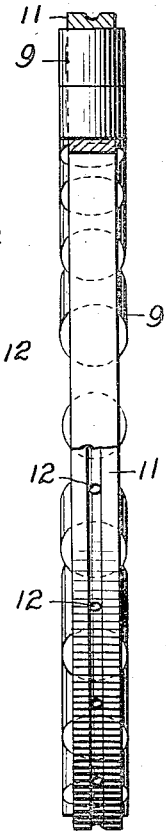
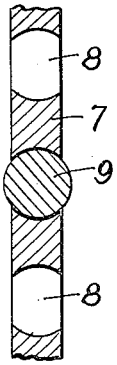
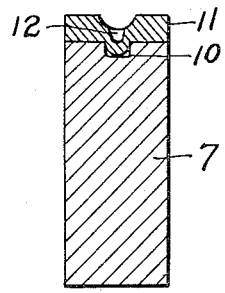
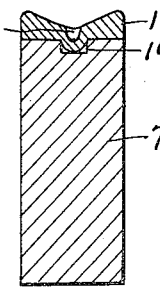
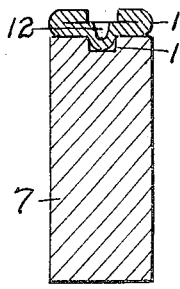
WITNESSES
J. Herbert Bradley.
INVENTOR
Edwin E. Arnold

UNITED STATES PATENT OFFICE.

EDWIN E. ARNOLD, OF PITTSBURGH, PENNSYLVANIA, ASSIGNOR TO IRON CITY PRODUCTS COMPANY, OF PITTSBURGH, PENNSYLVANIA, A CORPORATION OF PENNSYLVANIA.

RETAINER FOR ROLLER THRUST-BEARINGS.

1,324,769.  Specification of Letters Patent.  Patented Dec. 9, 1919.

Application filed July 15, 1918, Serial No. 244,956. Renewed October 24, 1919. Serial No. 333,114.

*To all whom it may concern:*

Be it known that I, EDWIN E. ARNOLD, a citizen of the United States, and a resident of Pittsburgh, in the county of Allegheny and State of Pennsylvania, have made a new and useful Invention in Retainers for Roller Thrust-Bearings, of which the following is a specification.

This invention relates to retainers for roller thrust bearings and an object is to provide a simple, relatively cheap and efficient retainer.

This, as well as other objects which will be apparent to those skilled in this art, I attain in the device described in the specification and illustrated in the drawings accompanying and forming a part of this application.

In the drawings, Figure 1 is a view partially in end elevation and partially in section of a device embodying this invention, Fig. 2 is an edge view partially in section of said device, Fig. 3 is a cross sectional view of a fragmentary portion of the device and Figs. 4, 5, and 6 are views in cross section illustrating different types of retaining rings capable of being utilized in this invention.

The retainers consist of an annular ring 7 which in its preferred form has radially extending holes drilled thereinto from the outer periphery as shown at 8, Fig. 3. These holes are of slightly greater diameter than the diameter of rollers 9 adapted to lie therein so as to project laterally beyond each side face of the retainer as shown in Figs. 2 and 3. Two or more rollers may be placed in each of the roller pockets or holes if desired. The outer periphery of the retainer is provided with a centrally located groove 10 and a metal retaining band 11 machined to snugly fit the outer periphery of retainer 7 surrounds the retainer and at its center, between openings 8, is punched or depressed into groove 10 as shown at 11.

The retainer band may be formed in any suitable manner but preferably as shown in either Figs. 4, 5 or 6. In Fig. 4 the band at its center is reduced in thickness or in other words a groove 12 is turned therein leaving a relatively thin web of metal joining the opposite sides and this thin web of metal is forced into groove 10 between holes 8. In Fig. 5 another type of ring having a reduced central web is shown and in Fig. 6 a ring is shown which is rolled out of sheet metal so as to provide a centrally located relatively thin web.

Having thus described my invention what I claim is—

1. A retainer for roller end thrust bearings, comprising an annular ring provided with radially extending roller pockets or channels and a circumferential groove, rollers within said channels and extending laterally therefrom, and a retainer band fitting said ring and between said roller pockets being depressed into said circumferential groove.

2. A retainer for roller end thrust bearings, comprising an annular ring having a circumferential groove and roller pockets or channels drilled thereinto from the outer circumference so as to extend radially of said ring, rollers in said pockets and a retainer ring provided with a relatively thin central portion and which between said pockets is depressed into said groove.

In testimony whereof I have hereunto subscribed my name this 3rd day of July, 1918.

EDWIN E. ARNOLD.